United States Patent
Ichihashi (10) Patent No.: US 10,348,932 B2
(45) Date of Patent: Jul. 9, 2019

(54) IMAGE PROCESSING APPARATUS, METHOD OF CONTROLLING THE SAME, AND NON-TRANSITORY COMPUTER-READABLE STORAGE MEDIUM THAT DECREASE THE LIGHTNESS OF PIXELS, EXCEPT FOR A HIGHLIGHT REGION, BASED ON A GENERATED LIGHTNESS HISTOGRAM

(71) Applicant: CANON KABUSHIKI KAISHA, Tokyo (JP)

(72) Inventor: Yukichika Ichihashi, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 41 days.

(21) Appl. No.: 15/638,533

(22) Filed: Jun. 30, 2017

(65) Prior Publication Data
US 2018/0054547 A1    Feb. 22, 2018

(30) Foreign Application Priority Data

Aug. 17, 2016    (JP) ................. 2016-160216

(51) Int. Cl.
*G06K 9/00* (2006.01)
*H04N 1/60* (2006.01)
(Continued)

(52) U.S. Cl.
CPC ......... *H04N 1/6008* (2013.01); *G06K 9/2054* (2013.01); *G06K 9/4642* (2013.01);
(Continued)

(58) Field of Classification Search
CPC .............. H04N 1/6008; G06K 9/2054; G06K 9/00718; G06K 9/00744; G06T 7/44;
(Continued)

(56) References Cited

U.S. PATENT DOCUMENTS

2006/0274936 A1* 12/2006 Ohkubo ............. G06K 9/00234
382/167
2008/0028298 A1* 1/2008 Kaneko ................... G06T 11/60
715/243

(Continued)

FOREIGN PATENT DOCUMENTS

JP    2009-063694 A    3/2009

OTHER PUBLICATIONS

Motoyoshi, Isamu, et al., "Image statistics and the perception of surface qualities," Nature, vol. 447, May 10, 2007, pp. 206-209.

*Primary Examiner* — Amir Alavi
(74) *Attorney, Agent, or Firm* — Venable LLP (57) ABSTRACT

An image processing apparatus includes a first extraction unit configured to extract an object included in image data, a second extraction unit configured to extract a highlight region of the object extracted by the first extraction unit, a generation unit configured to generate a lightness histogram of pixels in a region including the highlight region extracted by the second extraction unit and a region around the highlight region in the object, and a decreasing unit configured to decrease the lightness of the pixels, except for the highlight region, based on the lightness histogram generated by the generation unit. The first extraction unit, the second extraction unit, the generation unit, and the decreasing unit are implemented by at least one of a processor and a circuit.

15 Claims, 10 Drawing Sheets

(51) Int. Cl.
  *G06T 7/44* (2017.01)
  *G06K 9/20* (2006.01)
  *G06K 9/46* (2006.01)
  *G06K 9/62* (2006.01)
  *G06T 5/00* (2006.01)
  *G06T 5/40* (2006.01)
(52) U.S. Cl.
  CPC ......... *G06K 9/4652* (2013.01); *G06K 9/4661* (2013.01); *G06K 9/6224* (2013.01); *G06T 5/008* (2013.01); *G06T 5/40* (2013.01); *G06T 7/44* (2017.01); *H04N 1/6086* (2013.01); *H04N 1/6097* (2013.01)
(58) Field of Classification Search
  CPC . G06T 2207/30204; G06T 2207/30108; G06T 7/0004; G06T 5/008
  See application file for complete search history.

(56) References Cited

U.S. PATENT DOCUMENTS

| | | | |
|---|---|---|---|
| 2008/0232692 A1* | 9/2008 | Kaku | G06K 9/00362 382/190 |
| 2011/0128562 A1* | 6/2011 | Anazawa | G06F 3/04845 358/1.9 |
| 2014/0176596 A1* | 6/2014 | Kodavalla | G06T 11/001 345/604 |
| 2017/0201655 A1* | 7/2017 | Kuwada | H04N 1/3878 |
| 2017/0220632 A1* | 8/2017 | Miller | G06F 16/2428 |
| 2017/0278289 A1* | 9/2017 | Marino | G06T 7/44 |
| 2018/0054547 A1* | 2/2018 | Ichihashi | G06T 5/008 |
| 2018/0114068 A1* | 4/2018 | Balasundaram | G06T 7/0004 |
| 2018/0183979 A1* | 6/2018 | Higashikata | H04N 1/6008 |

* cited by examiner

IMAGE PROCESSING APPARATUS, METHOD OF CONTROLLING THE SAME, AND NON-TRANSITORY COMPUTER-READABLE STORAGE MEDIUM THAT DECREASE THE LIGHTNESS OF PIXELS, EXCEPT FOR A HIGHLIGHT REGION, BASED ON A GENERATED LIGHTNESS HISTOGRAM

CLAIM TO PRIORITY

This application claims the benefit of Japanese Patent Application No. 2016-160216, filed Aug. 17, 2016, which is hereby incorporated by reference herein in its entirety.

BACKGROUND OF THE INVENTION

Field of the Invention

The present invention relates to an image processing apparatus, a method of controlling the same, and a non-transitory computer-readable storage medium.

Description of the Related Art

In recent years, various proposals have been made about a method of detecting a texture, such as the transparency, glossiness, and metallic texture of an object surface, and a method of displaying a detected texture. For example, Japanese Patent Laid-Open No. 2009-63694 discloses a technique of determining the presence/absence of a glossy portion to perform display control of an image corresponding to an image signal in an image display apparatus, including a backlight, and expressing an image having glossiness without decreasing the luminance of the entire image. In this case, as a method of determining whether or not a glossy portion is present, a method of calculating the glossiness using the skewness of a lightness histogram described in "Image statistics and the perception of surface qualities", Nature, 447, pages 206-209, (2007) is used.

On the other hand, even in an image printed by an image processing apparatus, such as a multifunction peripheral or a printer, the expressions of texture and glossiness are required, in addition to tints and tonality. In association with these, the Image Statistics article can be referred to for the glossiness perceived by a human. The Image Statistics article describes that a high correlation exits between the physical gloss and brightness, distortion of the lightness histogram, and the perceptual gloss and brightness by doing psychophysical experiments. This correlation indicates that, for example, the lightness histogram distorts in a positive direction for the surface of a highly glossy image (the appearance frequency of pixels moderately spreads in a higher lightness level). The glossiness of an image surface can be evaluated based on the skewness of the lightness histogram. The distortion of the lightness histogram is based on a dichromatic reflection model. The dichromatic reflection model is a model by which two types of reflected light beams, that is, specular reflected light and diffuse reflected light are generated when light from a light source impinges on an object surface. The specular reflected light is light obtained when light of a light source that illuminates an object having glossiness is directly reflected. The specular reflected light is equivalent to a glossy portion on an image. The diffuse reflected light is light reflected upon receiving the influences of the surface property of the object and its color. The diffuse reflected light is an important factor of determining the tints and texture on an image. The Image Statistics article describes that a human being readily feels the glossiness when the distortion (skewness) of the lightness histogram by the specular reflected light and the diffuse reflected light increases.

In order to adjust the glossiness, however, in many cases, an appropriate value cannot be obtained even if the lightness histogram of an image is obtained and an adjustment value for adjusting the glossiness is calculated. In order to determine the presence/absence of the glossiness and to obtain the lightness histogram to adjust the glossiness, object lightness for causing an observer to feel gloss must be obtained. The lightness of image data is established by various factors constituting its image. For example, an automobile photograph includes the background and an automobile. In addition, the automobile includes a body, wheels, and the like. The body is large and includes a shadow portion. The lightness histogram obtained from the photographic image is greatly influenced by the lightness except for a place where the observer feels glossiness. For this reason, it is impossible to accurately determine whether an image includes a glossy portion.

SUMMARY OF THE INVENTION

In order to achieve the above object, an image processing apparatus according to an aspect of the present invention has the following arrangement. That is, the invention provides an image processing apparatus comprising a memory storing a set of instructions, and one or more processors that execute instructions of the set of the instructions and to cause the image processing apparatus to function as a first extraction unit configured to extract an object included in image data, a second extraction unit configured to extract a highlight region of the object extracted by the first extraction unit, a generation unit configured to generate a lightness histogram of pixels in a region including the highlight region extracted by the second extraction unit and a region around the highlight region in the object, and an adjustment unit configured to adjust the lightness of the pixels, except for the highlight region, based on the lightness histogram generated by the generation unit.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Embodiments of the present invention will be described hereafter in detail, with reference to the accompanying drawings. It is to be understood that the following embodiments are not intended to limit the claims of the present invention, and that, not all of the combinations of the aspects that are described according to the following embodiments are necessarily required with respect to the means to solve the problems according to the present invention.

First Embodiment

Figure 1:
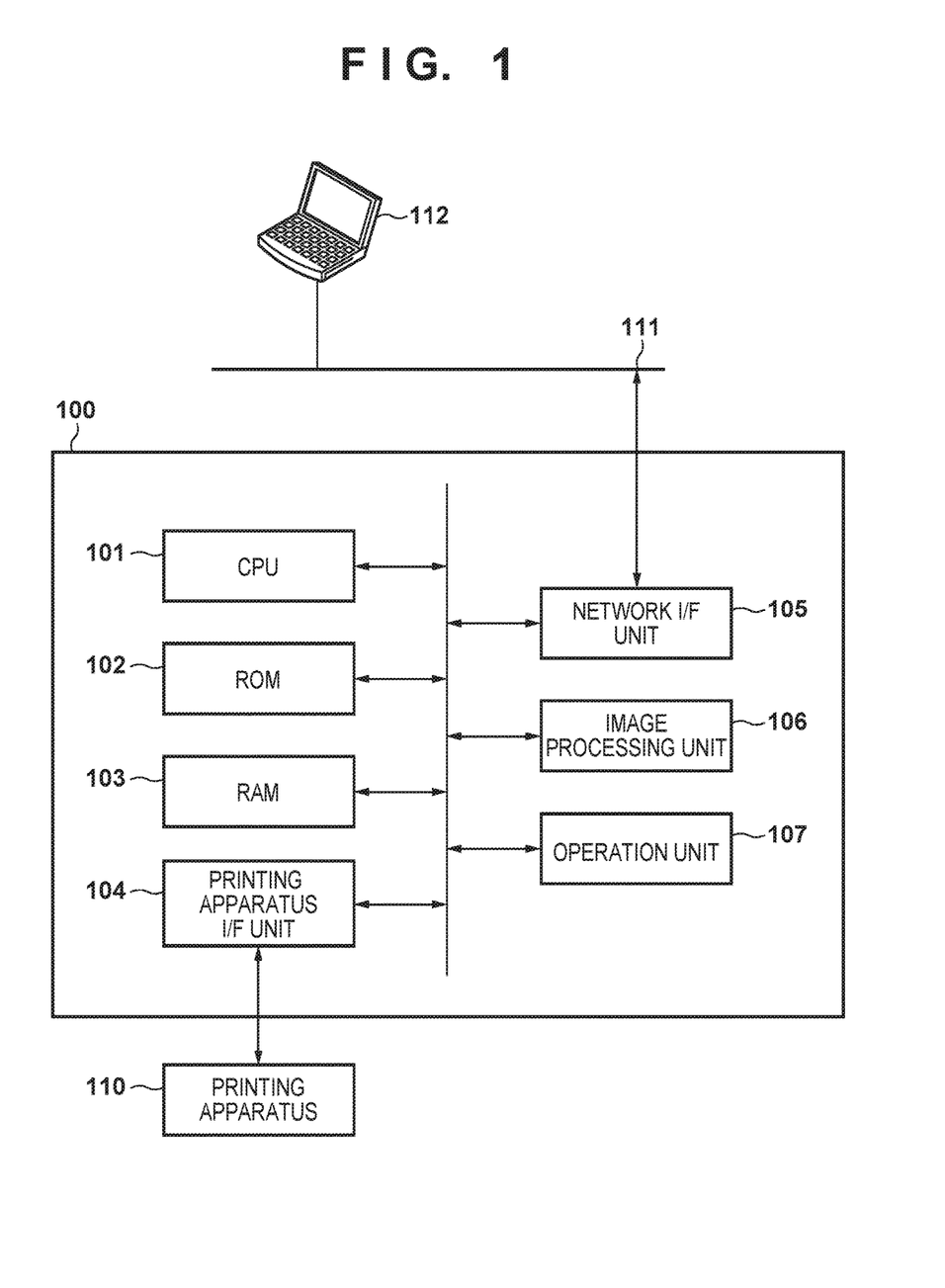
FIG. 1 is a block diagram showing the arrangement example of a printing system according to a first embodiment of the present invention.

FIG. 1 is a block diagram showing the arrangement example of a printing system according to the first embodiment of the present invention.

A print controller 100 is connected to a printing apparatus 110 via a printing apparatus I/F unit 104. The print controller 100 is connected to a network 111 via a network I/F unit 105. A PC (Personal Computer) 112 is connected to the network 111. At the time of printing, the print controller 100 receives PDL (Page Description Language) data from the PC 112. The print controller 100 includes an operation unit 107. A user can input various instructions and commands via this operation unit 107.

The print controller 100 further includes a CPU 101, a ROM 102, a RAM 103, and an image processing unit 106. The processes represented by the flowcharts to be described later are implemented in accordance with programs stored in the ROM 102 when the CPU 101 executes the processes using the RAM 103. The image processing unit 106 includes a dedicated arithmetic circuit that can execute, at high speed, a process requiring a long time when it is executed by the CPU 101. The image processing unit 106 executes some of the processes of the CPU 101. Note that, in the first embodiment, since the arithmetic operation of the CPU 101 is not distinguished from the arithmetic operation of the image processing unit 106, the arithmetic operations are not limited to one of operations of the CPU 101 and the image processing unit 106.

Figure 2:
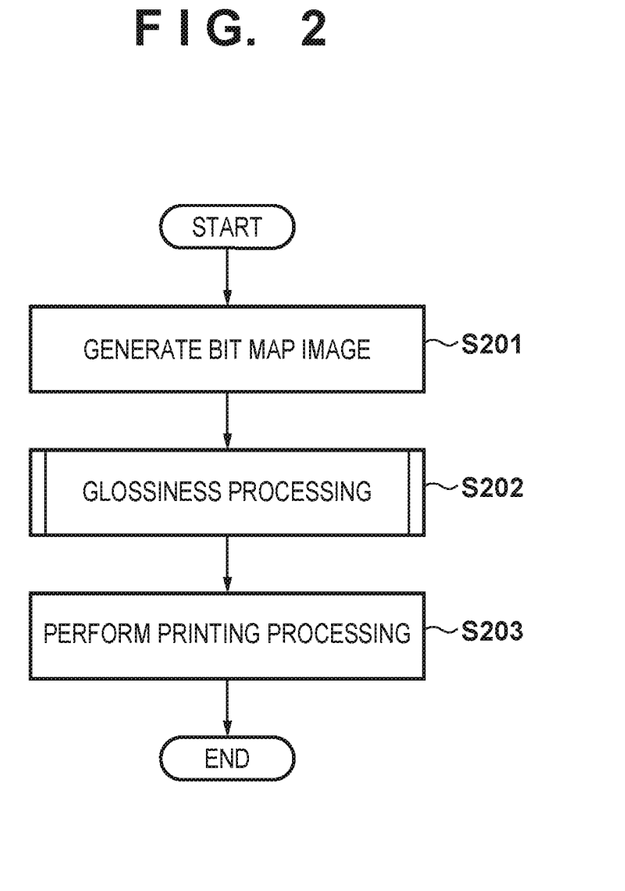
FIG. 2 is a flowchart for describing printing processing by a print controller according to the first embodiment.

FIG. 2 is a flowchart for describing the printing processing by the print controller 100 according to the first embodiment. Note that this processing is achieved when the CPU 101 executes programs stored in the ROM 102.

In step S201, the CPU 101 interprets PDL data received from the PC 112 to generate bit map image data. This PDL data describes an image such as a photographic image, graphic rendering data, and the like. The CPU 101 interprets the PDL data to generate RGB color bit map image data. The generated bit map image data is temporarily stored in the RAM 103. The process advances to step S202, and the CPU 101 executes glossiness processing based on the bit map image data stored in the RAM 103. The details of this glossiness processing will be described with reference to the flowchart in FIG. 3. Note that, in the first embodiment, in order to control the glossiness of a photographic image, the bit map image data is based on a photographic image obtained by capturing a specific object. When the glossiness processing is complete, the process advances to step S203. The processed image data is output to and printed by the printing apparatus 110. The printing apparatus 110 receives the RGB image data and converts it into CMYK image data. The printing apparatus 110 then performs halftone processing and prints an image based on the image data on a sheet.

Note that the present invention is also applicable to processing other than the printing processing. For example, it is also possible to transfer RGB image data from the network I/F unit 105 to the PC 112 again and to cause the PC 112 to store it as a digital image, or display it on a monitor.

Figure 3:
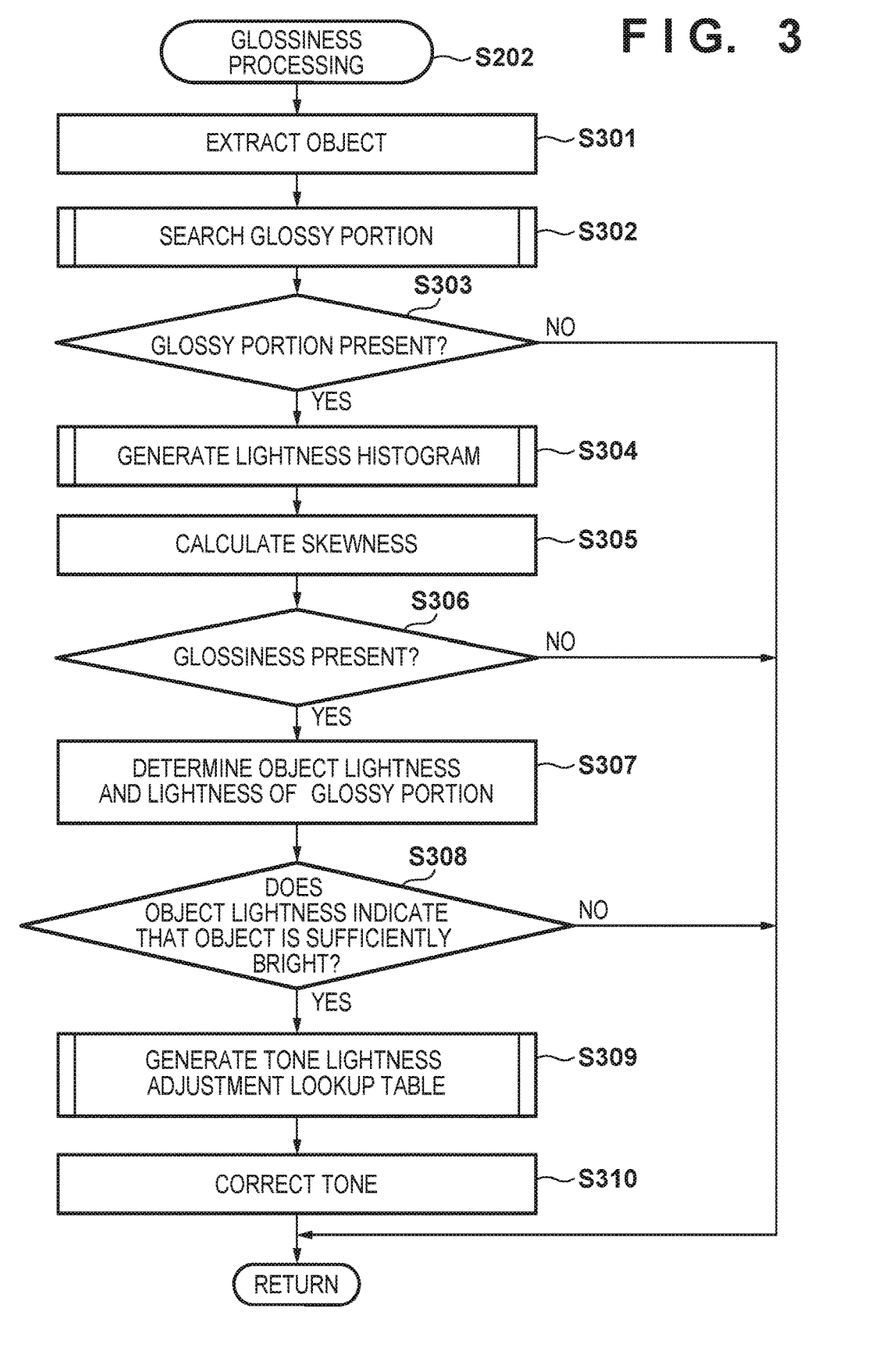
FIG. 3 is a flowchart for describing glossiness processing in step S202 of FIG. 2.

FIG. 3 is a flowchart for describing glossiness processing in step S202 of FIG. 2, which is processing by the print controller 100 according to the first embodiment.

First of all, in step S301, the CPU 101 extracts an object from bit map image data. Since the object is extracted from a photographic image, a region division algorithm is used. In recent years, various region division algorithms are proposed. For example, a group is formed for each pixel of the bit map data in accordance with a graph cut algorithm. As a result, by repeating integration of the groups, a region having a meaning such as an automobile, can be extracted as an object from one photographic image. In this case, if an object close to the center of an image and having a size of 30% or more of the area of the entire image is determined to be a first object. A plurality of objects may be extracted. If there are a plurality of objects, the subsequent processes are executed for each object. For the sake of descriptive simplicity, an example of processing the first object will be described below.

Figure 4A:
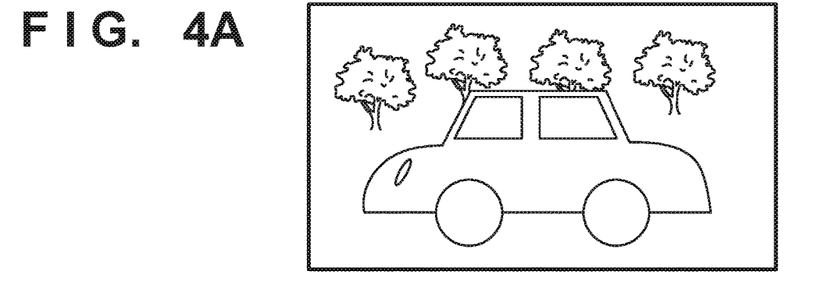
FIGS. 4A to 4C depict views for explaining a photographic image representing bit map image data according to the first embodiment.
Figure 4B:
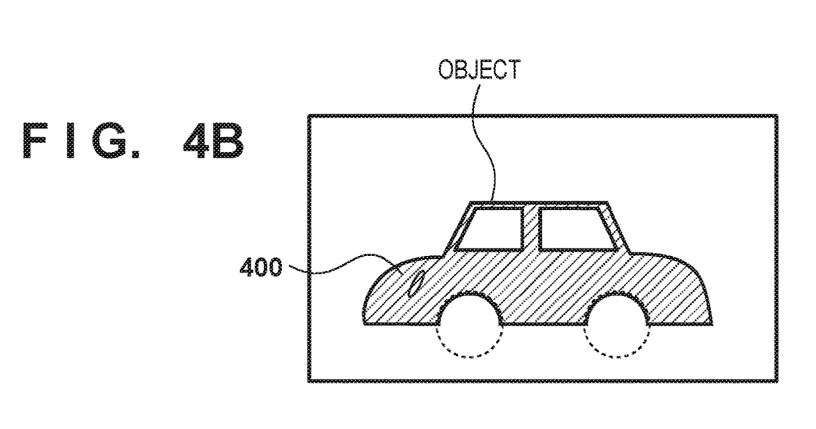
Figure 4C:
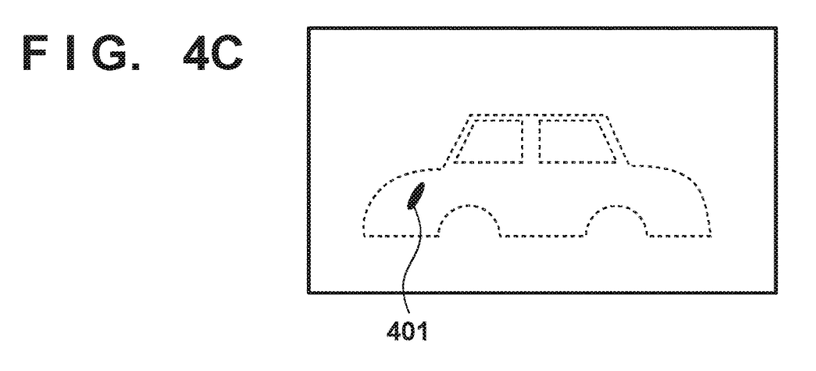

FIGS. 4A to 4C depict views for explaining an example of a photographic image represented by bit map image data according to the first embodiment.

FIG. 4A shows the entire photographic image of an automobile, and includes an automobile and the background. When region division processing is performed for the image in FIG. 4A, a body portion 400 of the automobile is extracted as the first object, as shown in FIG. 4B.

The process then advances to step S302, and the CPU 101 searches for a glossy portion from the object. That is, a search is performed for the glossy portion included in the object.

Figure 5:
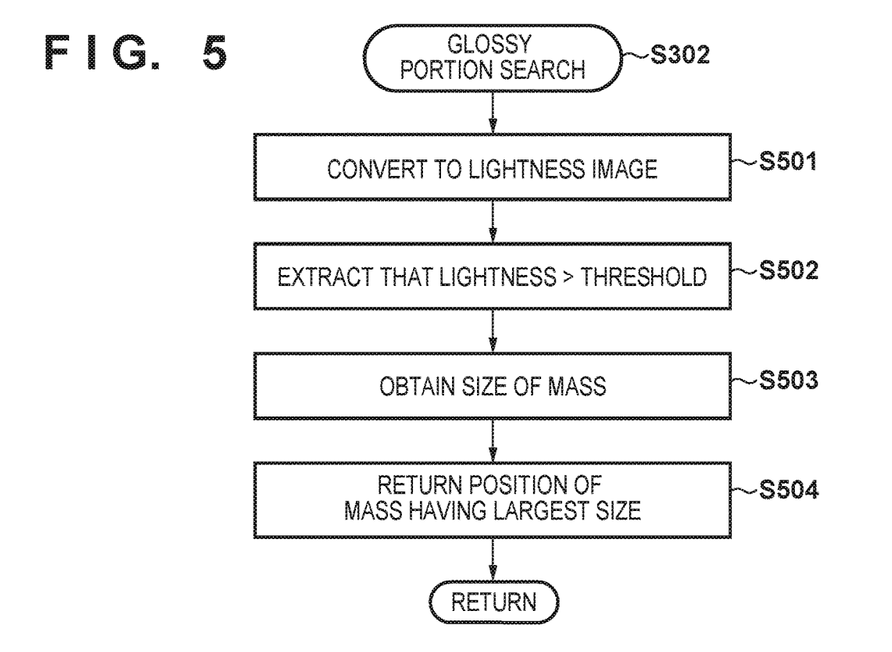
FIG. 5 is a flowchart for describing search processing of a glossy portion in step S302 of FIG. 3.

FIG. 5 is a flowchart for describing search processing of the glossy portion in step S302 of FIG. 3.

First of all, in step S501, the CPU 101 converts the bit map image data into lightness image data. In this case, the RGB image data is converted into the lightness data, and its conversion equation changes depending on the color space of the RGB image. In this case, when RGB data defined by the CIE-sRGB color space is considered, a lightness signal L can be calculated by:

$$L=((0.21 \times R^{2.2}/255+0.71 \times G^{2.2}/255+0.07 \times B^{2.2}/255)/100)^{1/3} \times 255/100 \qquad (1)$$

where R is the signal value of red of the image data, G is the signal value of green of the image data, and B is the signal value of blue of the image data. This equation is an equation for extracting only a lightness component L* in the common color space of CIE-L*a*b*.

The process then advances to step S502, and the CPU 101 generates a binary image by extracting a portion where the lightness of the object is a threshold or more. This generation is to extract the highlight portion of the object. For example, if a lightness image is 8-bit image data, the threshold is appropriately "210" or more. Note that, even in specular reflected light having a small exposure amount at the time of photographing, and supported to be brightest in the image data, may have a threshold of "210" or less. If this occurs, contrast adjustment, or the like, is performed. Before step S502 is performed, the image data must be converted into appropriate data. An example of such appropriate binary image data is shown in FIG. 4C. In FIG. 4C, the edge of the object is expressed by broken lines for the sake of illustrative convenience. This indicates the range of the image for binary processing, but does not indicate the image data itself. In the example of FIG. 4C, a highlight region 401 is extracted from the object.

The process then advances to step S503, and the CPU 101 obtains the central position and size of a mass of the highlight region 401 extracted in step S502. As a method of detecting such a pixel mass, there is available a method of searching for a boundary portion of the binary images (the highlight region and a region except the highlight region) and defining as the mass a portion where the boundary portions are connected. When the coordinates of the boundary portions are specified, integration is performed using the coordinates of the boundary portions, thereby calculating the size of the mass. By using the arithmetic average of the coordinates of the boundary portions of the mass, the central coordinates of the mass are calculated. In addition, when a plurality of such masses are detected, the size and position of each mass are calculated.

The process then advances to step S504. The CPU 101 specifies the position and size of the largest mass in the masses (glossy portions) of the highlight portion calculated in step S503 and specifies it as the glossy portion. The process then advances to step S303. Note that, if no glossy portion is found in step S503, its size is set as "0", thereby determining that no glossy portion is found. The search processing of the glossy portion in step S302 has been described.

The process then advances to step S303 of FIG. 3. The CPU 101 determines whether or not the search processing in step S302 has detected the glossy portion. If the glossy portion is detected, the process advances to processing of step S304. Otherwise, that is, if the size of the glossy portion is "0", the absence of the glossy portion is determined, and the process ends. In step S304, the CPU 101 generates the lightness histogram using the glossy portion found in step S302 and the lightness of the neighboring portion.

Figure 6:
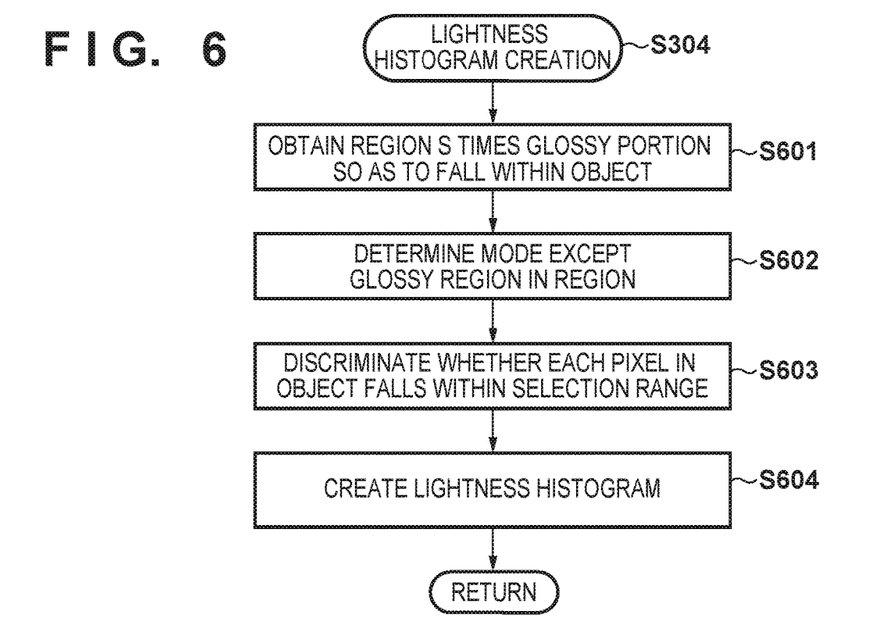
FIG. 6 is a flowchart for describing creation processing of a lightness histogram in step S304 of FIG. 3.

FIG. 6 is a flowchart for describing creation processing of the lightness histogram in step S304 of FIG. 3.

First of all, in step S601, the CPU 101 specifies a provisional object lightness from the central position and size of the glossy portion found in step S302. For example, if the size of the glossy portion is given by thirty (30) pixels, a region having an amount capable of sufficiently calculating the skewness is required. In this case, the region of (30×S) pixels is selected as a magnification factor S for this purpose. In this case, S is sufficiently one hundred (100) times and is given as "100". In order to obtain this region, a method of counting the number of pixels from the central coordinates of the glossy portion to the outside is considered. Note that, since this region must fall within the object, if the region falls outside the object, this region is excluded from the counting target.

The process then advances to step S602, and the CPU 101 obtains the mode of the pixel lightness, except for the glossy portion in the region determined in step S601.

Figure 7A:
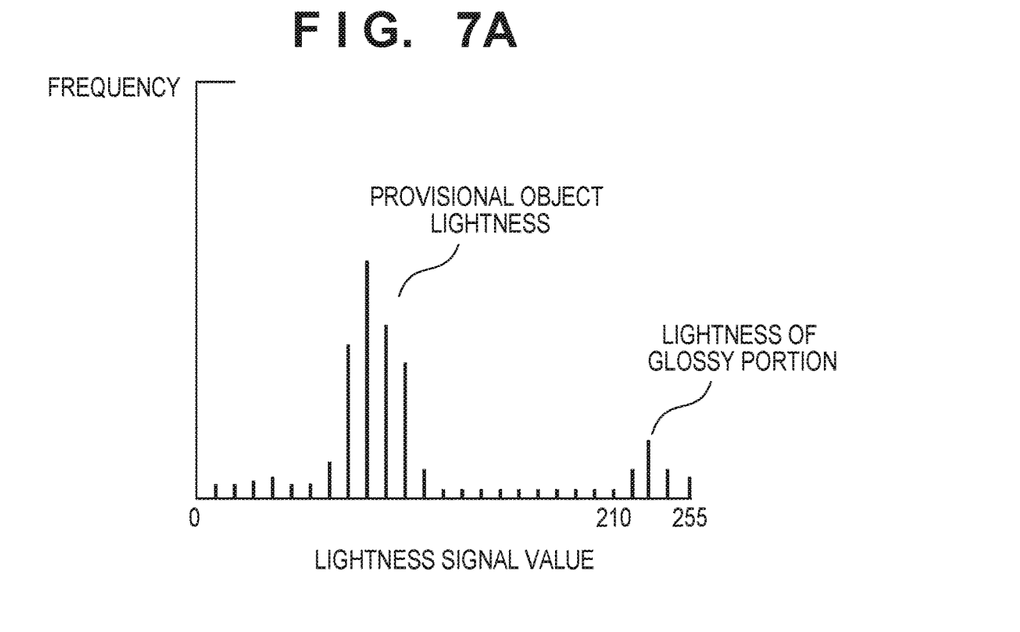
FIGS. 7A and 7B depict views illustrating graphs showing an example of a histogram according to the first embodiment.

FIG. 7A depicts a view illustrating a graph showing an example of the histogram according to the first embodiment. The lightness having the highest appearance frequency of the pixels except for the glossy portion is defined as a provisional object lightness. In the example of FIG. 7A, the mode of the pixel lightness of the glossy portion is "230", and the mode (provisional object lightness) of the lightness of pixels, except, for the glossy portion is almost "90".

The process then advances to step S603, and the CPU 101 determines whether or not the lightness of each pixel falling within the object and excluding each pixel of the glossy portion is counted in the final histogram. This is determined in accordance with the distance from the center of the glossy portion to that pixel. The following calculation is performed for each pixel:

$$L(x,y)-L)\times\sqrt{((x-x0)^2+(y-y0)^2)} < \text{threshold} \qquad (2)$$

where x and y are coordinates except the glossy portion, L(x,y) is the lightness of each pixel, L is the provisional object lightness, x0 is the x-coordinate of the center of the glossy portion, and y0 is the y-coordinate of the center of the glossy portion.

Note that, the threshold is a preset value. In inequality (2), a pixel larger than the threshold is determined to be a pixel other than the target that is not used for the calculation of the lightness histogram.

The process then advances to step S604 and the CPU 101 creates the lightness histogram of a pixel (a pixel in the region around the glossy portion) except for the glossy portion in the object. Note that, the lightness histogram is created based on the lightness of a pixel except for the pixel determined not to serve as the target in step S603.

Figure 7B:
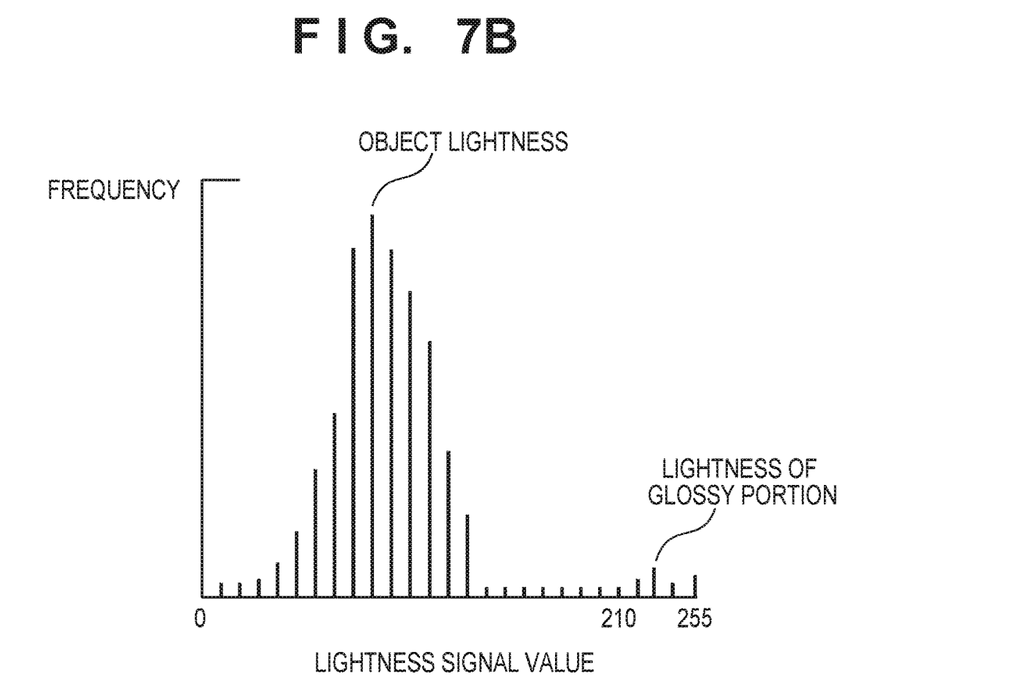

An example of the lightness histogram to be created is shown in FIG. 7B. Referring to FIG. 7B, the object lightness is specified based on the lightness of a pixel having the highest appearance frequency in a region S times the glossy portion.

Referring back to FIG. 3, when the creation processing of the lightness histogram in step S304 is complete, the process advances to step S305. The CPU 101 calculates the distortion (skewness) of the lightness histogram from the lightness histogram obtained in step S304. This skewness is calculated by:

$$\text{skewness} = \Sigma(Xi - Xave)^3 / N \times \sigma^3 \qquad (3)$$

where N is the number of data, xi is each data value, Xave is the arithmetic average, and σ is the standard deviation.

The process then advances to step S306, and the CPU 101 determines whether or not the skewness in step S305 is positive, that is, whether or not the object has glossiness. In this case, if the skewness is negative, the object is considered not to have glossiness, thereby directly ending the process. If the image is determined to have glossiness, the image data can be adjusted to increase the glossiness. For this reason, the process advances to step S307.

In step S307, the CPU 101 obtains the lightness of the glossy portion and the lightness of the object based on the lightness histogram obtained in step S304. The lightness of the glossy portion is given by specular reflected light and has a low peak in a high-lightness region.

In the example of FIG. 7A, the lightness of the glossy portion has a peak in a portion where the lightness is equal to or higher than 210, thereby obtaining the lightness of the glossy portion. In addition, the object lightness can be the mode because the portion having the largest region in the object is determined to be the lightness of the object. Referring to FIG. 7B, the object lightness serving as the lightness of the color of the automobile body in FIG. 4A is obtained as, for example "100".

The process then advances to step S308, and the CPU 101 determines whether or not the object lightness obtained in step S307 indicates excessive darkness. If the object lightness indicates the excessive darkness (for example, less than 100), the CPU 101 determines that the object lightness indicates the excessive darkness, thereby ending the processing. If the object lightness indicates darkness, a trouble in which the object portion is too dark must be avoided, even if the skewness of the lightness histogram is increased. If the object lightness falls within about 100 to 200, the glossiness can be increased by tone adjustment.

In step S308, if it is determined that the object lightness indicates that the object is not so dark, that is, sufficiently bright, the process advances to step S309. The CPU 101 generates a tone adjustment lookup table using the object lightness and the lightness of the glossy portion calculated in step S307.

Figure 8:
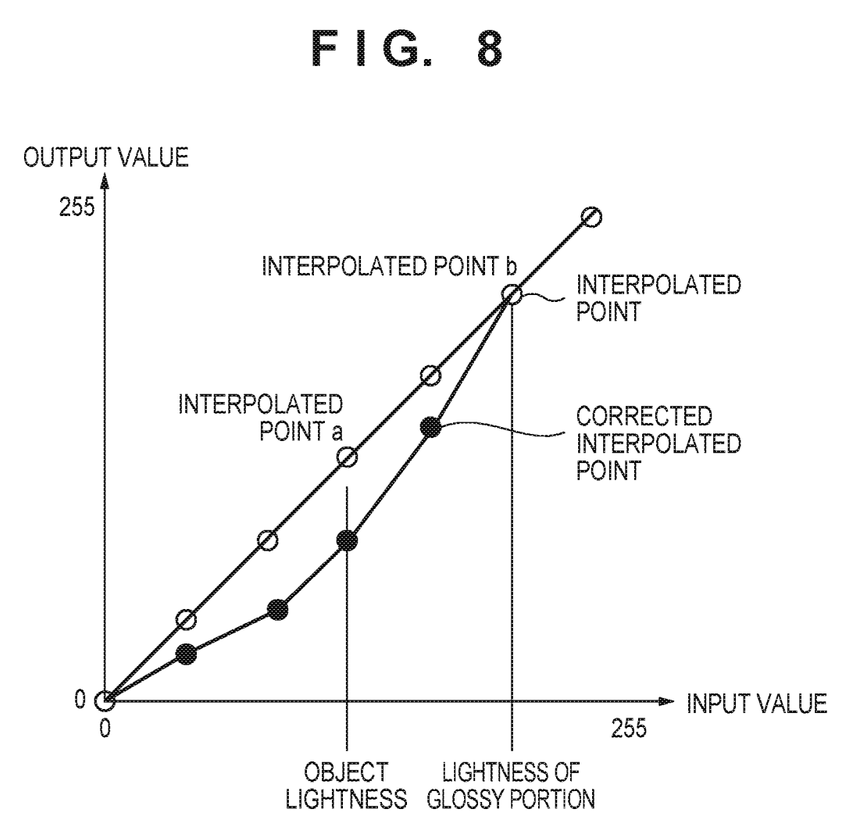
FIG. 8 depicts a view illustrating a graph for explaining a method of creating a lookup table for tone adjustment according to the first embodiment.

FIG. 8 depicts a view illustrating a graph for explaining a method of creating the tone adjustment lookup table in the first embodiment.

First of all, N interpolated points are generated. N=6 is set in FIG. 8. At this time, the six interpolated points have the same input and output values and are generated at the equal intervals. The input values are specified as values that are the object lightness and the lightness of the glossy portion. All of these values are already obtained in step S305.

Referring to FIG. 8, an interpolated point corresponding to the object lightness is defined as an interpolated point a. In addition, an interpolated point corresponding to the lightness of the glossy portion is defined as an interpolated point b. The lightness is decreased at a predetermined ratio for an output value lower than the lightness of the glossy portion. In this case, the lightness is decreased by about 20% to 30%. However, an adjustment value for adjusting the decrease width may be accepted from the operation unit 107. The reason why the object lightness is decreased is that the lightness histogram is further distorted by decreasing the object lightness. When the lightness histogram is further distorted, the object can readily obtain the glossiness accordingly. At an interpolated point that is darker than the interpolated point b, the lightness is decreased by 20% to 30%. This lookup table has characteristics that maintain the output value at the interpolated point b and gradually decrease the output value to 0% when the interpolated point between the interpolated point a and the interpolated point b comes close to the interpolated point b. As described above, when the interpolated points are determined, these interpolated points are connected by an interpolation arithmetic method such as spline interpolation. This makes it possible to generate the lookup table formed from data obtained by quantifying the obtained characteristic curve.

The process then advances to step S310. The CPU 101 converts each RGB pixel data of the photographic image into CIE-L*a*b* and applies the lookup table generated in step S309 to only the lightness L of the object pixel. The resultant data is then converted into RGB data again, thereby ending the glossiness processing in step S202.

As has been described above, according to the first embodiment, the region around the glossy portion is appropriately determined. This makes it possible to adjust the lightness of this region, thereby obtaining an effect in which the glossiness of the image represented by image data can be emphasized.

Second Embodiment

In the first embodiment, as a result of region division, the divided object has a simple arrangement. That is, since only the automobile body is extracted by the region division, the lightness of the glossy portion and the lightness of the object can readily be obtained. However, in fact, an object may be divided in a state in which automobile wheels are included. For example, if semantic division of the object using opportunity learning is performed, the object is determined to be the automobile including the wheels. Semantic object division has wider application techniques such as image search. In addition, if the automobile body is very large, the adjustment of the glossiness is greatly influenced at a location spaced apart from the glossy portion, regardless of a small influence on the glossiness. To cope with this, the second embodiment will describe a method capable of adjusting the glossiness for a semantically divided object or a large object. Note that, since the arrangement, and the like, of a printing system according to the second embodiment are the same as those in the first embodiment, only portions different from the first embodiment will be described.

FIGS. 9A to 9D depict views showing an example of extracting an object in step S301 according to the second embodiment of the present invention.

Figure 9A:
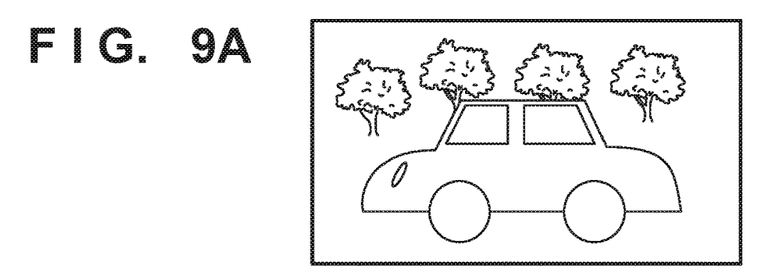
FIGS. 9A to 9D depict views for explaining an example for extracting an object in step S301 of FIG. 3 according to a second embodiment of the present invention.
Figure 9B:
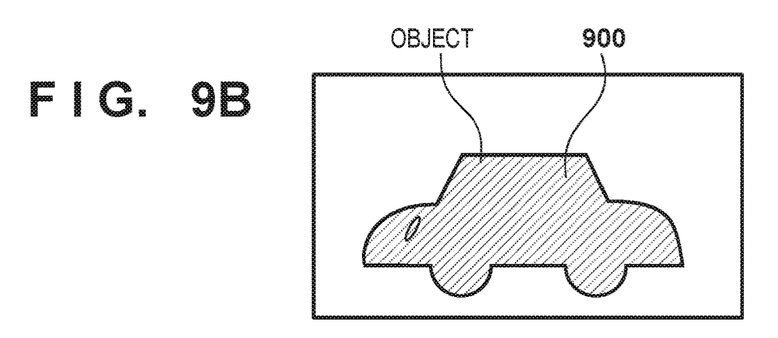
Figure 9C:
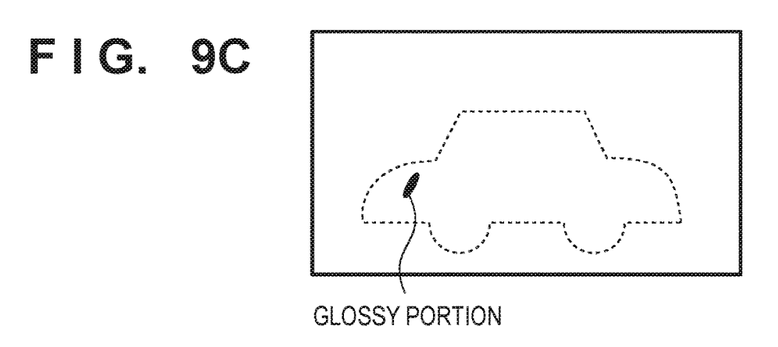
Figure 9D:
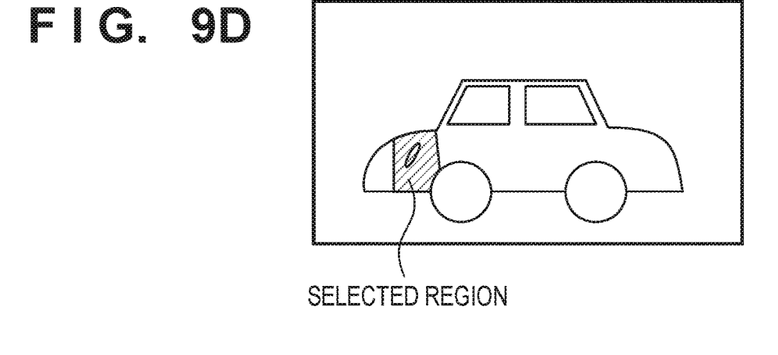

FIG. 9A shows the entire photographic image of an automobile and includes the automobile and its background. Referring to FIG. 9B, an object is determined to be an object 900 including the wheels, and the like, of the automobile.

The difference from the first embodiment is the method of creating the lightness histogram in step S304 and will be described with reference to the flowchart of FIG. 10.

Figure 10:
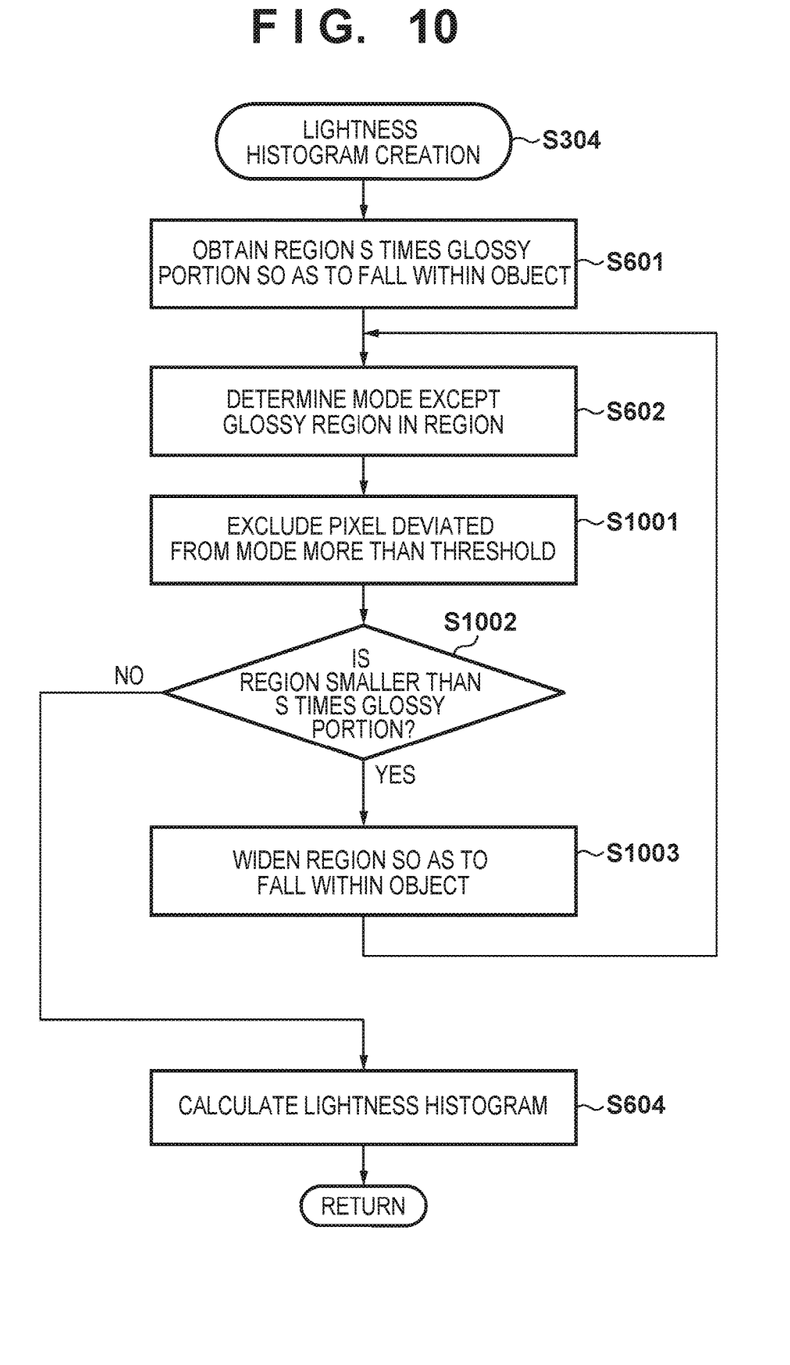
FIG. 10 is a flowchart for describing creation processing of the lightness histogram in step S304 of FIG. 3 according to the second embodiment.

FIG. 10 is a flowchart for describing creation processing of the lightness histogram in step S304 of FIG. 3 according to the second embodiment.

Processes in steps S601, S602, and S604 of FIG. 10 are the same as those shown in the flowchart of FIG. 6 described in the first embodiment, and a detailed description thereof will be omitted. Note that a magnification factor S in step S601 is assumed to be a value larger than that in the first embodiment. For example, the magnification factor is set as S=about 100 in the first embodiment, but the second embodiment requires S=about 300.

In step S1001, a CPU 101 excludes, from the histogram target, a pixel whose lightness is largely different from the mode of the lightness histogram. The glossiness perceived by a human depends on the skewness of the object lightness histogram of a glossy portion and its surrounding portion. This makes it possible to exclude different materials, although portions are determined to be the same object. This makes it possible to exclude the wheels from an object 900 in FIG. 9A. This is because the pixel having a largely deviated lightness is assumed to be a pixel irrelevant to the glossiness. For example, in FIG. 9D, the portion of the automobile wheels is defined as a region except for the target of the region for which the lightness histogram is obtained. This portion is excluded from region selection, and the lightness histogram is calculated again.

The process then advances to step S1002. The CPU 101 determines whether or not the size of the region obtained in step S1001 includes the number of pixels enough to create a histogram, that is, whether or not the size of the region is smaller than the magnification factor S. If the size is determined to be smaller, the region is determined not to have a sufficient size. The process advances to step S1003, and the CPU 101 widens the region range. The process then advances to step S602 to perform the process in step S602 again. For example, the magnification factor S is set to S×1.1 in step S1003. In this manner, the number of pixels to be selected is increased to ensure the number of pixels enough to create the histogram. If the CPU 101 determines in step S1002 that the number of pixels becomes a size large enough to create histogram, that is, that the region has a size S times the size of the glossy portion, the process advances to step S604. The lightness histogram is calculated based on the lightness of the pixel in the region.

As has been described above, according to the second embodiment, for example, if the object is determined to include the automobile wheels, the region serving as a target for obtaining the lightness histogram is extracted in the object, and the lightness histogram can be obtained. Even if the object including pixels having large lightness differences is determined, the optimal region for obtaining the lightness histogram is determined. The glossiness of the glossy portion can be adjusted based on the lightness histogram obtained from that region.

Third Embodiment

In the first embodiment, the interpolated points are decreased at a predetermined ratio to create a lightness adjustment lookup table. To the contrary, the third embodiment will describe a case in which a plurality of lookup tables are generated, and a lookup table for automatically generating an image having the optimal glossiness is selected.

Figure 11:
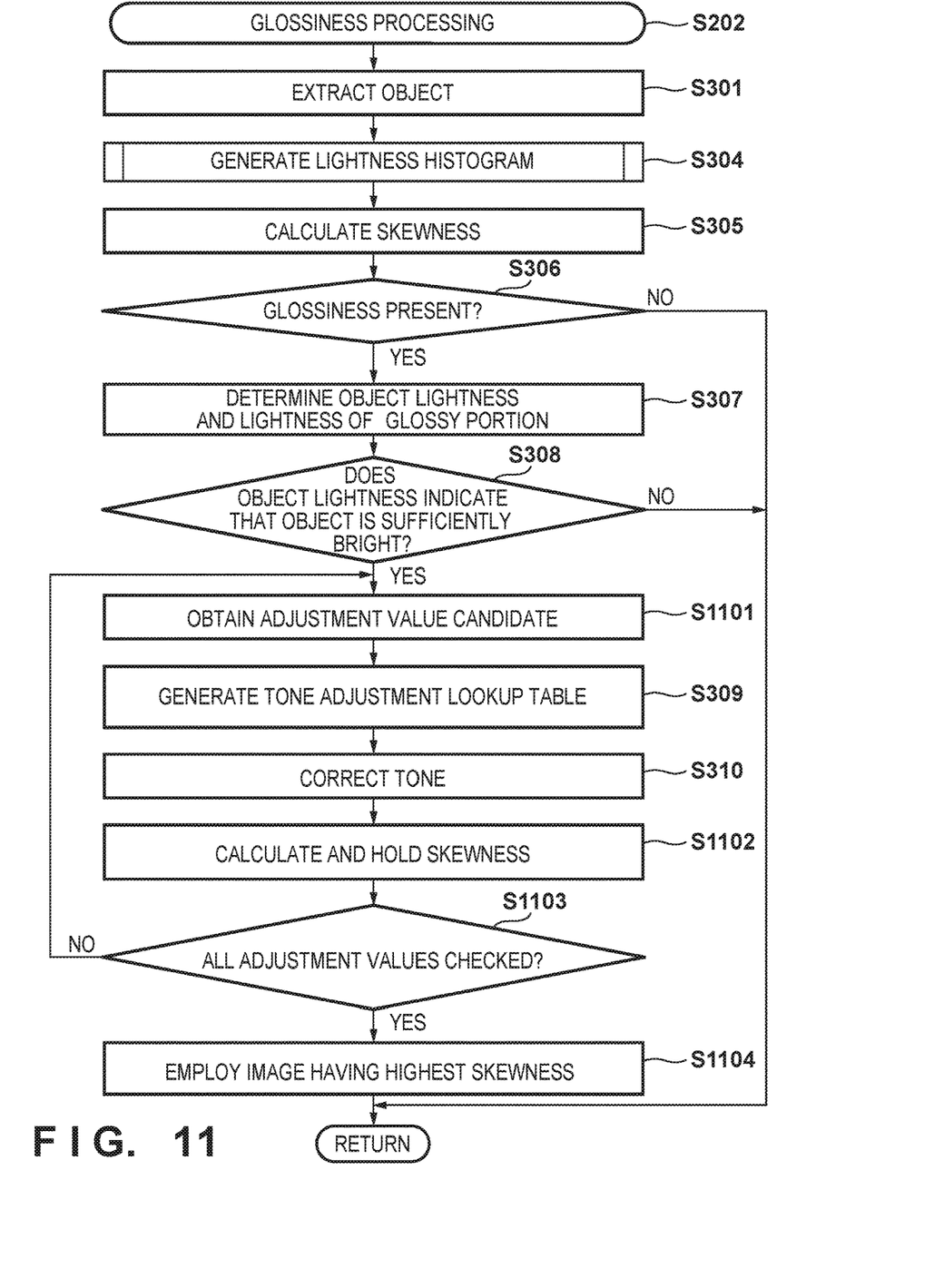
FIG. 11 is a flowchart for describing glossiness processing (step S1002) used in a third embodiment.

FIG. 11 is a flowchart for describing glossiness processing in step S202 of FIG. 2 according to the third embodiment. Note that, in FIG. 11, the same portion as in the flowchart of FIG. 3 according to the first embodiment is denoted by the same reference symbol, and a detailed description thereof will be omitted.

In step S1101, a CPU 101 obtains an adjustment value candidate for adjusting the glossiness. In this case, the adjustment value candidate is pre-stored in a ROM 102, but may be input from an operation unit 107. The adjustment value candidate is set with an increment of 5% from 10% to 40%. This adjustment value indicates a ratio for decreasing the lightness of an interpolated point darker than an interpolated point b in the example of FIG. 8.

After that, in steps S309 and S310, lookup tables corresponding to the respective adjustment values are created, and lightness correction is performed using such a lookup table. This is identical to the first embodiment. The process then advances to step S1102, and the CPU 101 calculates skewness again. The skewness equation has been described in equation (3). Note that the skewness calculated at this time and the corrected image data are stored in the RAM 103. The process advances to step S1103, and the CPU 101 determines whether or not all of the adjustment value candidates listed in step S1101 are applied. If all of the candidates are applied, the process advances to step S1104. Otherwise, the process returns to step S1101 and recalculation is performed. In step S1104, the CPU 101 employs, as data after glossiness processing, image data having the highest skewness among the skewness values obtained in step S1102.

As has been described above, according to the third embodiment, the plurality of lightness adjustment lookup tables are generated, and the lookup table having the highest skewness of the lightness histogram is selected from the plurality of lookup tables and used to adjust the glossiness of the image data.

Other Embodiments

Embodiments of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., an application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
a first extraction unit configured to extract an object included in image data;
a second extraction unit configured to extract a highlight region of the object extracted by the first extraction unit;
a generation unit configured to generate a lightness histogram of pixels in a region including the highlight region extracted by the second extraction unit and a region around the highlight region in the object; and
a decreasing unit configured to decrease the lightness of the pixels, except for the highlight region, based on the lightness histogram generated by the generation unit,
wherein the first extraction unit, the second extraction unit, the generation unit, and the decreasing unit are implemented by at least one of a processor and a circuit.

2. The apparatus according to claim 1, wherein the generation unit obtains, in the object, a region including the highlight region and including pixels around the highlight region in an object obtained by excluding, from a histogram target, pixels of lightness greatly deviated from a mode of the lightness histogram of the object, and generates a lightness histogram of pixels included in the region.

3. The apparatus according to claim 1, wherein a size of the region is a size at least one hundred (100) times a size of the highlight region.

4. The apparatus according to claim 1, wherein the decreasing unit decreases the lightness of the pixels using a lookup table, and the lookup table has characteristics in which the lightness of the pixels in the highlight region is maintained and the lightness of the pixels excluded from the highlight region and included in the region is decreased.

5. The apparatus according to claim 4, wherein the decreasing unit decreases the lightness of the pixels using a plurality of different lookup tables and adjusts the lightness of the pixels, except for the highlight region, based on a histogram having the highest skewness of the lightness histogram of the pixels.

6. The apparatus according to claim 1, wherein the region is determined in accordance with at least one of a distance from the highlight region and a difference between the lightness of the pixels of the highlight region and the lightness of the pixels around the highlight region.

7. The apparatus according to claim 1, wherein the decreasing unit decreases the lightness of the pixels, except for the highlight region, when the skewness of the histogram is positive.

8. The apparatus according to claim 1, wherein the decreasing unit decreases the lightness of the pixels, except for the highlight region, based on the lightness histogram generated by the generation unit, to control the skewness of the lightness histogram of the pixels.

9. A method of controlling image processing, the method comprising:
    extracting an object included in an image;
    extracting a highlight region of the object extracted in the extracting;
    generating a lightness histogram of pixels in a region including the highlight region extracted in the extracting and a region around the highlight region in the object; and
    decreasing the lightness of the pixels except for the highlight region based on the lightness histogram generated in the generating.

10. A non-transitory computer-readable storage medium storing computer executable instructions that cause a processor to execute a method of controlling image processing, the method comprising:
    extracting an object included in image data;
    extracting a highlight region of the object extracted in the extracting;
    generating a lightness histogram of pixels in a region including the highlight region extracted in the extracting and a region around the highlight region in the object; and
    decreasing the lightness of the pixels, except for the highlight region, based on the lightness histogram generated in the generating.

11. An image processing apparatus comprising:
    a first extraction unit configured to extract an object included in image data;
    a second extraction unit configured to extract a highlight region of the object extracted by the first extraction unit; and
    a decreasing unit configured to decrease the lightness of the pixels, except for the highlight region extracted by the second extraction unit,
    wherein the first extraction unit, the second extraction unit, and the decreasing unit are implemented by at least one of a processor and a circuit.

12. The apparatus according to claim 11, wherein the decreasing unit decreases the lightness of the pixels, except for the highlight region, when the skewness of the histogram is positive.

13. The apparatus according to claim 11, wherein a size of the region is a size at least one hundred (100) times a size of the highlight region.

14. The apparatus according to claim 11, wherein the decreasing unit decreases the lightness of the pixels using a lookup table, and the lookup table has characteristics in which the lightness of the pixels in the highlight region is maintained and the lightness of the pixels excluded from the highlight region and included in the region is decreased.

15. The apparatus according to claim 14, wherein the decreasing unit decreases the lightness of the pixels using a plurality of different lookup tables and adjusts the lightness of the pixels, except for the highlight region, based on a histogram having the highest skewness of the lightness histogram of the pixels.

* * * * *